(12) United States Patent
Lin

(10) Patent No.: US 9,856,894 B2
(45) Date of Patent: Jan. 2, 2018

(54) CLIPBOARD CLIP

(71) Applicant: Ming Fuk Leung, Kowloon, Hong Kong (CN)

(72) Inventor: Chunhai Lin, Guangdong (CN)

(73) Assignee: Ming Fuk Leung, Hong Kong (CN)

( * ) Notice: Subject to any disclaimer, the term of this patent is extended or adjusted under 35 U.S.C. 154(b) by 0 days.

(21) Appl. No.: 14/406,785

(22) PCT Filed: Jun. 8, 2013

(86) PCT No.: PCT/CN2013/076971
§ 371 (c)(1),
(2) Date: Dec. 10, 2014

(87) PCT Pub. No.: WO2013/185573
PCT Pub. Date: Dec. 19, 2013

(65) Prior Publication Data
US 2015/0143670 A1    May 28, 2015

(51) Int. Cl.
*F16B 2/10*   (2006.01)
*B42F 9/00*   (2006.01)
*B42F 1/00*   (2006.01)

(52) U.S. Cl.
CPC .............. *F16B 2/10* (2013.01); *B42F 1/006* (2013.01); *B42F 9/001* (2013.01); *Y10T 24/204* (2015.01)

(58) Field of Classification Search
CPC .. B42F 9/001; B42F 1/00; B42F 1/006; Y10T 24/202; Y10T 24/203; Y10T 24/204; F16B 2/10
USPC ........................................... 24/67.7
See application file for complete search history.

(56) References Cited

U.S. PATENT DOCUMENTS 4,961,249 A * 10/1990 Liu ................. B42F 9/001
                                                    24/500

\* cited by examiner

*Primary Examiner* — Abigail Troy
(74) *Attorney, Agent, or Firm* — Ming Chow; Sinorica, LLC

(57) ABSTRACT

A novel clipboard clip comprises a bottom plate, torsion springs and a hook frame pivoted with the bottom plate through the torsion springs, wherein a clamping regulator is disposed between two end portions of the hook frame and includes a rotary shaft provided with a push block, a handle and an elastic member; the rotary shaft is fixedly connected with the hook frame which drives the rotary shaft to rotate; the handle is movably mounted on the bottom plate; the rotary shaft and the handle are adjacent to each other; both ends of the elastic member support the handle and the bottom plate respectively; in the process of opening the hook frame, the rotary shaft rotates and the push block pushes the handle until the push block is clamped below the handle.

10 Claims, 5 Drawing Sheets

CLIPBOARD CLIP

FIELD OF THE INVENTION

The invention relates to the technical field of office supplies, in particular to a novel clipboard clip.

BACKGROUND OF THE INVENTION

In the prior art, there are various home and office clipboard clips. Most clipboard clips can be only opened after clamping devices of the clipboard clips are pressed by external force, and the clipboard clips will be in the clamping state when the external force disappears. In the case of frequent clamping actions, the clamping devices must be pressed frequently, and hence users will consume more labor and the working efficiency will be affected.

SUMMARY OF THE INVENTION

The invention provides a novel clipboard clip capable of maintaining the opening state and being simple and fast in operation.

In order to solve the technical problem, the invention adopts the technical proposal that: the invention relates to a novel clipboard clip, which comprises a bottom plate, torsion springs and a hook frame pivoted with the bottom plate through the torsion springs, wherein a clamping regulator is disposed between two end portions of the hook frame and includes a rotary shaft provided with a push block, a handle and an elastic member; the rotary shaft is fixedly connected with the hook frame which drives the rotary shaft to rotate; the handle is movably mounted on the bottom plate; the rotary shaft and the handle are adjacent to each other; both ends of the elastic member support the handle and the bottom plate respectively; and in the process of opening the hook frame, the rotary shaft rotates and the push block pushes the handle until the push block is clamped below the handle, and hence the handle is reset under the action of the elastic member and the push block is pressed in such a way that the opening state is maintained.

Preferably, the bottom plate includes a fixing portion matched with the hook frame for clamping and mounting grooves formed by extending from the fixing portion; and the torsion springs are embedded into the mounting grooves.

Preferably, an abutting portion is also formed by extending from the fixing portion; and one end of the elastic member supporting the bottom plate specifically abuts against the abutting portion.

Preferably, the handle is provided with a positioning hole; and the bottom plate is provided with a connecting hole formed by extending from the abutting portion and is also provided with a pin running through the positioning hole and the connecting hole.

Preferably, jack catches are formed by extending from two side portions of the handle respectively; and the two jack catches are respectively accommodated in gaps between the mounting grooves and the rotary shaft.

Preferably, the fixing portion is provided with fixing holes fixed with the outside world.

Preferably, clamping blocks are respectively disposed on two end portions of the hook frame; and bayonets engaged with the clamping blocks are respectively disposed on two end portions of the rotary shaft.

Preferably, an operating part is disposed at one end of the handle directing outwards and provided with non-slip patterns.

Preferably, the elastic member is a pressure spring; a fixing blind hole is formed at one end of the handle directing towards the bottom plate; and one end of the pressure spring abuts against the fixing blind hole and the other end of the pressure spring abuts against the abutting portion.

Preferably, the elastic member is a spring plate integrally formed with the handle; and the spring plate is disposed on the abutting portion.

The clipboard clip provided by the invention has the advantages that: the invention provides a novel clipboard clip, which comprises a bottom plate, torsion springs and a hook frame pivoted with the bottom plate through the torsion springs, wherein a clamping regulator is disposed between two end portions of the hook frame and includes a rotary shaft provided with a push block, a handle and an elastic member; the rotary shaft is fixedly connected with the hook frame which drives the rotary shaft to rotate; the handle is movably mounted on the bottom plate; the rotary shaft and the handle are adjacent to each other; both ends of the elastic member support the handle and the bottom plate respectively; and in the process of opening the hook frame, the rotary shaft rotates and the push block pushes the handle until the push block is clamped below the handle, and hence the handle is reset under the action of the elastic member and the push block is pressed in such a way that the opening state is maintained. The hook frame is broke apart so that the handle presses the push block, and hence the opening state can be maintained. A user only needs to press the handle so that a portion of the handle pressing the push block is away from the push block, and hence the press power born by the push block disappears and the clipboard clip is clamped. Therefore, the operation is simple and fast.

DETAILED DESCRIPTION OF THE PREFERRED EMBODIMENTS

Further description will be given below to the invention with reference to the embodiments and the accompanying drawings for the convenience of the understanding of those skilled in the art. The content involved in the embodiments is not intended to limit the invention.

Embodiment 1

Figure 1:
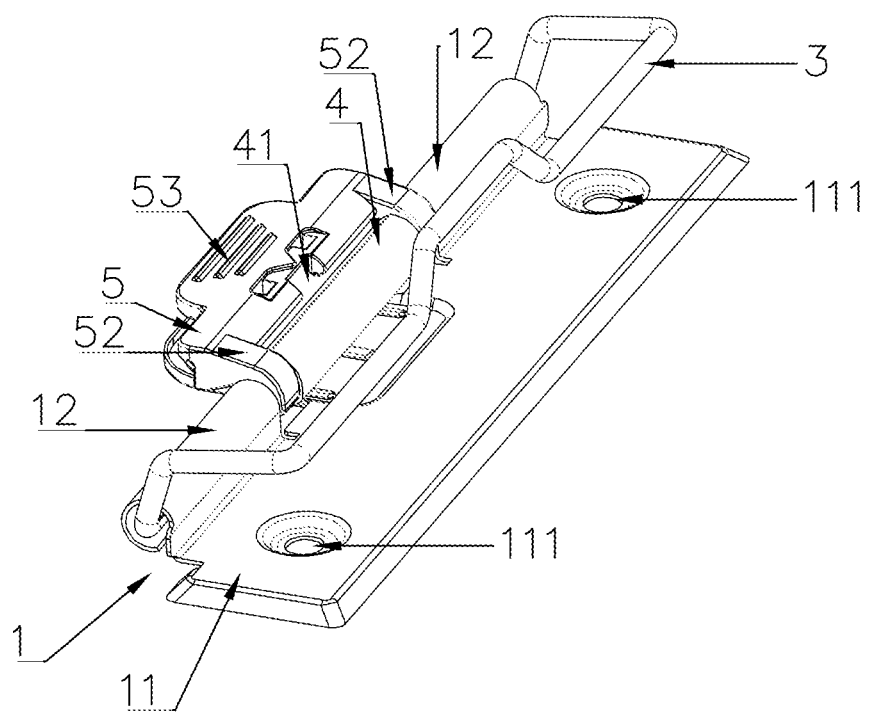
FIG. 1 is a schematic structural view illustrating the opening state of an embodiment 1 of the invention.
Figure 2:
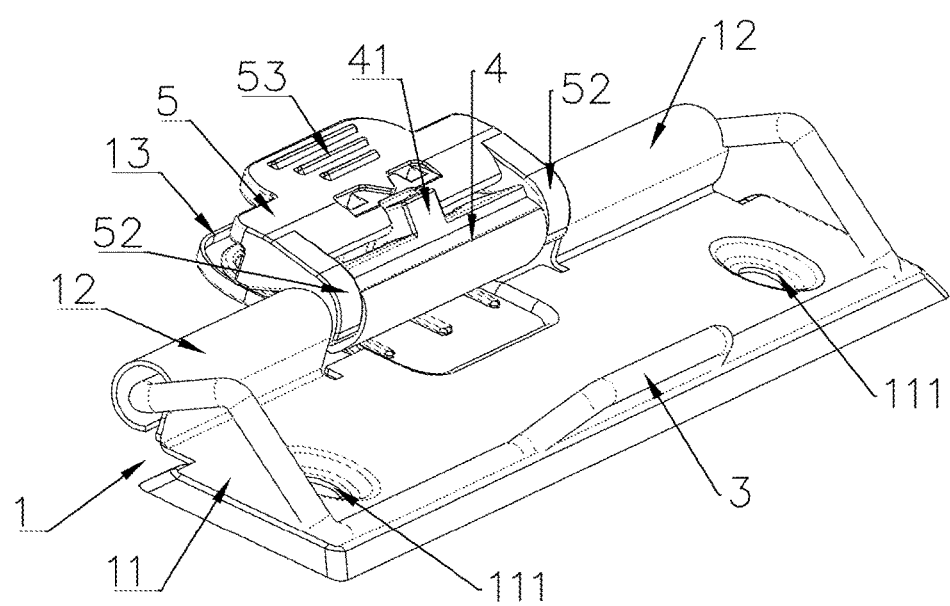
FIG. 2 is a schematic structural view illustrating the clamping state of the embodiment 1 of the invention.
Figure 3:
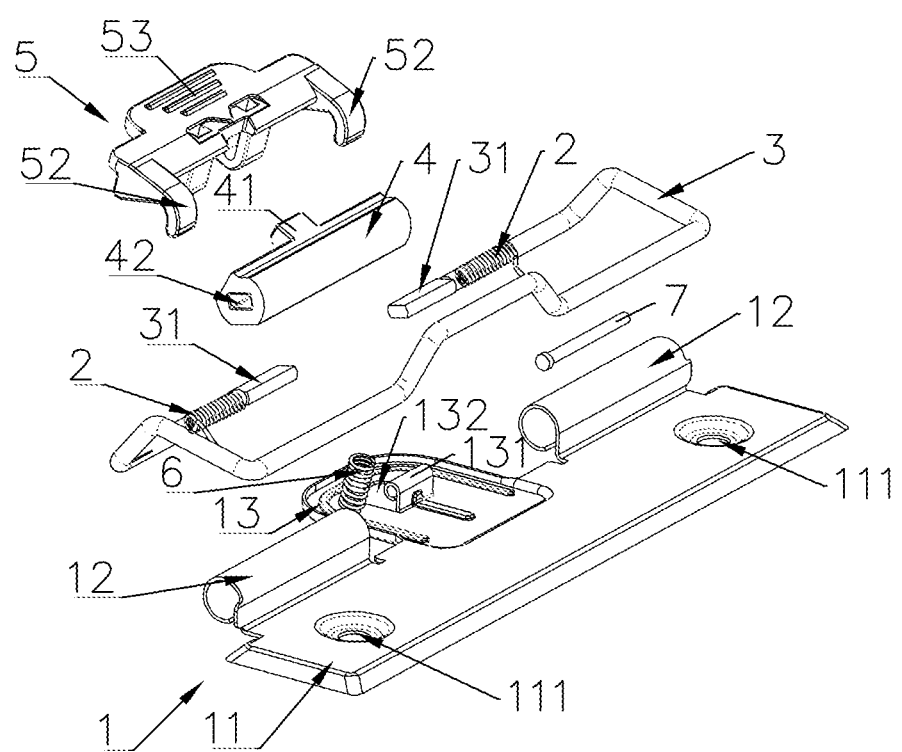
FIG. 3 is an exploded view of the embodiment 1 of the invention.

As illustrated in FIGS. 1 to 3, the invention relates to a novel clipboard clip, which comprises a bottom plate 1, torsion springs 2 and a hook frame 3 pivoted with the bottom plate 1 through the torsion springs 2, wherein a clamping regulator is disposed between two end portions of the hook frame and includes a rotary shaft 4 provided with a push block 41, a handle 5 and an elastic member; the rotary shaft 4 is fixedly connected with the hook frame 3 which drives the rotary shaft 4 to rotate; the handle 5 is movably mounted on the bottom plate 1; the rotary shaft 4 and the handle 5 are adjacent to each other; both ends of the elastic member support the handle 5 and the bottom plate 1 respectively; in the process of opening the hook frame 3, the rotary shaft 4 rotates and the push block 41 pushes the handle 5 until the push block 41 is clamped below the handle 5, and hence the handle 5 is reset under the action of the elastic member and the push block 41 is pressed in such a way that the opening state is maintained.

Figure 5:
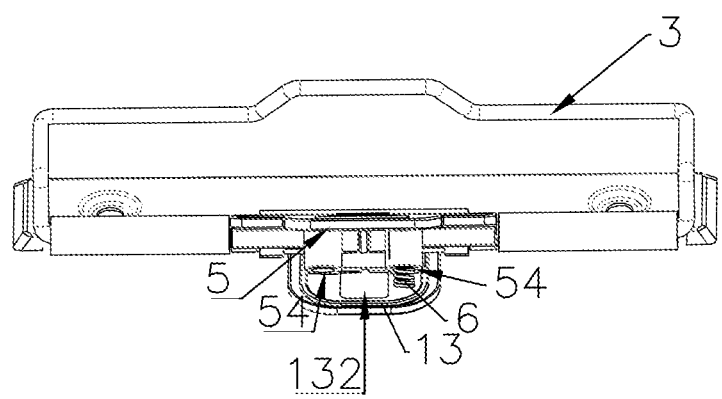
FIG. 5 is a schematic structural view illustrating the opening state of the embodiment 1 of the invention seen from another angle of view.
Figure 6:
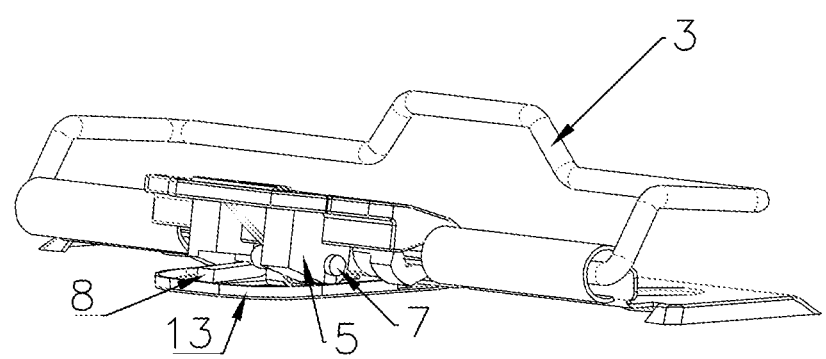
FIG. 6 is a schematic structural view illustrating the opening state of an embodiment 2 of the invention.

As illustrated in FIGS. 5 and 6, both ends of the elastic member of the invention can abut against or be connected with the handle 5 and the bottom plate 1 respectively.

In the embodiment, the elastic member is a pressure spring 6. As illustrated in FIGS. 1 and 2, in order to save more labor when the handle 5 is pushed under the premise of maintaining the opening state when the push block 41 is engaged with the handle 5, a notch is formed at a position of the handle 5 corresponding to the push block 41. Under the clamping state, the push block 41 is accommodated into the notch. In the process of opening the hook frame 3, the rotary shaft 4 rotates; the push block 41 overcomes the acting force of the pressure spring 6 and pushes the handle 5 until the push block 41 runs through the notch and is finally clamped below the handle 5; and the handle 5 is reset under the acting force of the pressure spring 6 and hence presses the push block 41 to maintain the opening state.

As illustrated in FIG. 1, in a preferred embodiment, the push block 41 is square, so that the push block 41 pushes the handle 5 via a large push surface when the rotary shaft 4 rotates, and hence the phenomenon of breakage easily generated when the push block 41 is triangular can be avoided.

As illustrated in FIGS. 1 to 3, in the embodiment, the hook frame 3 is half-surrounded, two end portions of which are aligned and laterally symmetrical; the clamping regulator is disposed between the two end portions; and a force pulling the hook frame 3 can be evenly applied to the clamping regulator. For more convenient and safer operation of pulling the hook frame 3, gaps are partially retained between the hook frame 3 and the bottom plate 1, and a user can pull the hook frame 3 from the gaps.

As illustrated in FIGS. 1 to 3, the bottom plate 1 includes a fixing portion 11 matched with the hook frame 3 for clamping and mounting grooves 12 formed by extending from the fixing portion 11, and the torsion springs 2 are embedded into the mounting grooves 12. By adoption of the design, the torsion springs 2 are isolated from the outside world, and hence the mutual damage between the torsion springs 2 and the outside world in the use process can be avoided, for instance, piercing a finger of the user or forcibly pulling the torsion springs 2 by external force. One end of the torsion spring 2 is riveted with the hook frame 3 and the other end abuts against a groove wall of the mounting groove 12, so that the torsion spring 2 obtains large supporting force.

As illustrated in FIG. 3, an abutting portion 13 is also formed by extending from the fixing portion 11, and one end of the elastic member supporting the bottom plate 1 specifically abuts against the abutting portion 13. The abutting portion 13 is formed by extending from a central portion of one end of the fixing portion 11 provided with the mounting grooves 12, is projected out of the fixing portion 11, and is in the same plane with the fixing portion 11. An edge of the abutting portion 13 capable of making contact with the outside world is slightly smoothly raised, so that the case that the sharp edge pierces a contact object can be avoided.

Figure 4:
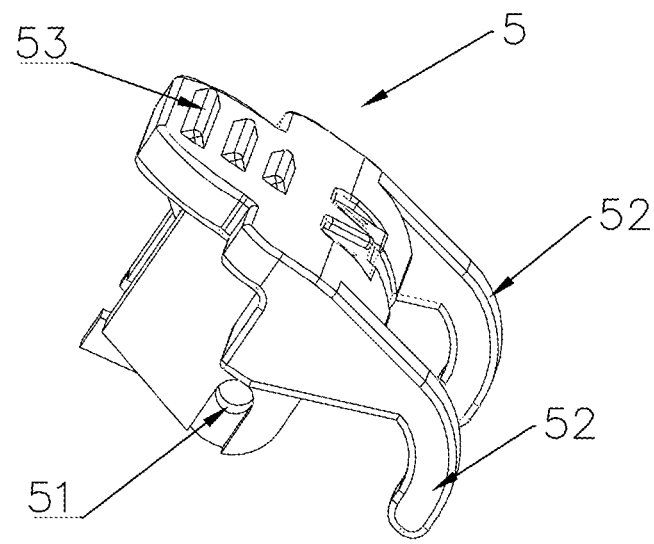
FIG. 4 is a schematic structural view of a handle of the embodiment 1 of the invention.

As illustrated in FIGS. 3 and 4, the handle 5 is provided with a positioning hole 51; the bottom plate 1 is provided with a connecting hole 131 formed by extending from the abutting portion 13 and is also provided with a pin 7 running through the positioning hole 51 and the connecting hole 131; and the handle 5 is fixed on the abutting portion 13 through the pin 7. As illustrated in FIG. 3, the connecting hole 131 is subjected to punch forming; a punched portion of the abutting portion 13 is provided with a through hole 132; and the user can fix the clipboard clip with the outside world via the through hole 132, for instance, the clipboard clip is hung on a nail.

As illustrated in FIGS. 1 to 3, jack catches 52 are formed by extending from two side portions of the handle 5 respectively; the two jack catches 52 are respectively accommodated into the gaps between the mounting grooves 12 and the rotary shaft 4. For the convenient assembly of the rotary shaft 4, the spacing between the two mounting grooves 12 is larger than the length of the rotary shaft 4; one end of the jack catch 52 supports the mounting groove 12 and the other end supports the rotary shaft 4; and hence the case that the rotary shaft 4 runs along the clamping blocks 32 in the gaps of the mounting grooves 12 can be effectively avoided. Meanwhile, the appearance of the clipboard clip is more beautiful.

As illustrated in FIGS. 1 to 3, the fixing portion 11 is provided with fixing holes 111 fixed with the outside world. The clipboard clip provided by the invention can be fixed on a desktop or other object according to use requirements.

As illustrated in FIG. 3, the clamping blocks 31 are formed on end portions of the hook frame 3, and bayonets 42 engaged with the clamping blocks 31 are formed on end portions of the rotary shaft 4. Preferably, the clamping blocks 31 and the bayonets 42 are polygonal, so that the clamping blocks 31 and the bayonets 42 can be more firmly clamped after assembly. The rotary shaft 4 can rotate with the hook frame 3.

As illustrated in FIG. 4, an operating part (not shown in the figure) is formed at one end of the handle 5 directing outwards. In the embodiment, one end away from the rotary shaft 4 directs outwards. The opening part is provided with non-slip patterns 53. The non-slip patterns 53 are projected on the surface of the handle 5 and include but are not limited to straight lines, wavy lines and characters.

As illustrated in FIG. 5, a fixing blind hole 54 is formed at one end of the operating part directing towards the bottom plate 1; and one end of the pressure spring 6 abuts against the fixing blind hole 54 and the other end abuts against the abutting portion 13. In a preferred embodiment, the fixing blind hole 54 is formed on the operating part of the handle 5, so that a force pressing the clamping regulator can be well conducted to the pressure spring 6 sleeved in the fixing blind hole 54.

Embodiment 2

The differences between the embodiment 2 and the embodiment 1 are as follows: the elastic member is a spring plate 8 integrally formed with the handle 5, and the spring plate 8 is disposed on the abutting portion 13. As illustrated in FIG. 6, a side surface of the spring plate 8 makes contact with the bottom plate 1. After the handle 5 is pressed, the spring plate 8 abuts against the bottom plate 1 to generate an elastic force. Other characteristics of the embodiment 2 are the same with those of the embodiment 1. No further description will be given here.

In the clipboard clip provided by the invention, the surface of the bottom plate 1 is subjected to anti-corrosive treatment, and the handle 5 is preferably made of plastic materials with high hardness. A correct clipboard clip closing operation is to press the operating part. But in the case of misoperation, for instance, when the hook frame 3 under the opening state is pressed, the clipboard clip can also be closed and not damaged.

The above is only preferred embodiments of the invention. Variations will be made to the specific embodiments and the application range by those skilled in the art on the basis of the concept of the invention. The content of the description should not be construed as the limitation of the invention.

What is claimed is:

1. A novel clipboard clip comprising:
a bottom plate;
a torsion spring;
a hook frame;
the hook frame being pivoted with the bottom plate through the torsion spring;
a clamping regulator;
the clamping regulator being connected with an end portion of the hook frame;
the clamping regulator comprising a rotary shaft, a handle and an elastic member;
the rotary shaft comprising a push block;
the rotary shaft being fixedly connected with the hook frame;
the hook frame being capable of driving the rotary shaft to rotate;
the handle being movably mounted on the bottom plate;
the rotary shaft and the handle being located adjacent to each other;
two ends of the elastic member being biased against the handle and the bottom plate respectively;
the push block being configured to be clamped below the handle by the hook frame rotating the rotary shaft and rendering the push block to push the handle; and
the push block being configured to be pressed by the handle through the two ends of the elastic member being biased against the handle and the bottom plate respectively.

2. The novel clipboard clip according to claim 1 wherein the bottom plate comprises a fixing portion and a mounting groove;
the fixing portion corresponds to the hook frame;
the mounting groove is formed by extending from the fixing portion; and
the torsion spring is embedded into the mounting groove.

3. The novel clipboard clip according to claim 2 wherein the bottom plate comprises an abutting portion;
the abutting portion is formed by extending from the fixing portion; and
one of the two ends of the elastic member abut against the abutting portion.

4. The novel clipboard clip according to claim 3 wherein the handle comprises a positioning hole and a pin;
the bottom plate comprises a connecting hole;
the connecting hole is formed by extending from the abutting portion; and
the pin runs through the positioning hole and the connecting hole.

5. The novel clipboard clip according to claim 3 wherein the elastic member is a pressure spring;
the handle comprises a fixing blind hole;
the fixing blind hole is oriented towards the bottom plate; and
the pressure spring abutting against the fixing blind hole and against the abuts portion.

6. The novel clipboard clip according to claim 3 wherein the elastic member is a spring plate;
the spring plate is integrally formed with the handle; and
the spring plate is disposed on the abutting portion.

7. The novel clipboard clip according to claim 2 wherein the handle comprises a jack catch;
the jack catch is formed by extending from a side portion of the handle; and
the jack catch is accommodated in a gap between the mounting groove and the rotary shaft.

8. The novel clipboard clip according to claim 2 wherein the fixing portion comprises a plurality of fixing holes.

9. The novel clipboard clip according to claim 1 wherein the hook frame comprises a clamping block;
the clamping block is disposed on the end portion;
the rotary shaft comprises a bayonet;
the bayonet is disposed on an edge of the rotary shaft; and
the bayonet is engaged with the clamping block.

10. The novel clipboard clip according to claim 1 wherein the handle comprises an operating part;
the operating part is disposed outwards; and
the operating part comprises a plurality of non-slip patterns.

* * * * *